May 26, 1970     D. M. DE BOWER ET AL     3,513,994
BOTTOM DISCHARGE SILO CONSTRUCTION
Filed Sept. 27, 1968     3 Sheets-Sheet 1
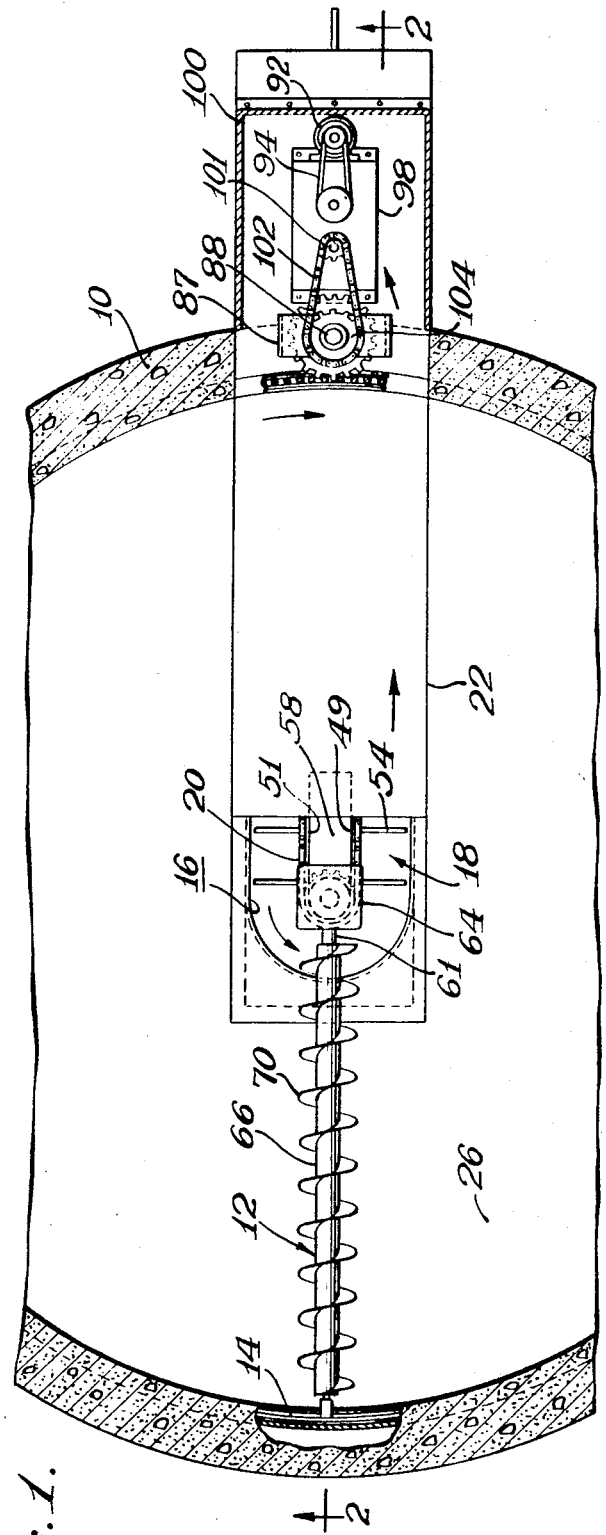
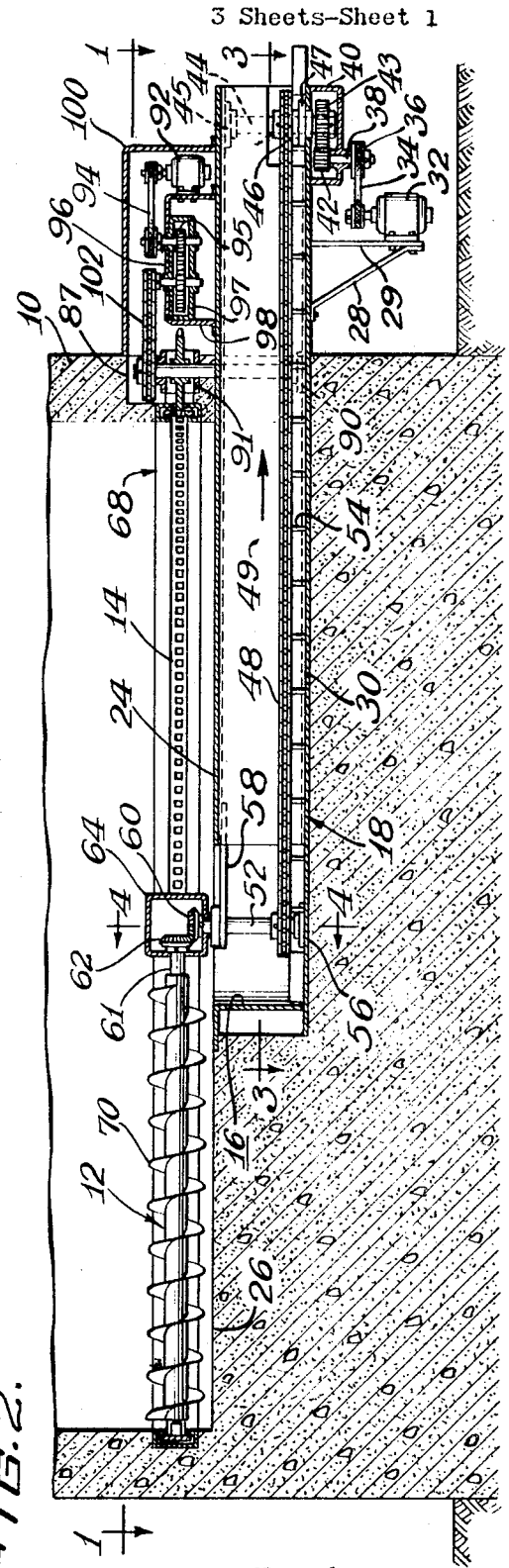
Inventors:
DONALD M. DE BOWER
& PETE M. WARFIELD
By Bair, Freeman & Molinare Attys.

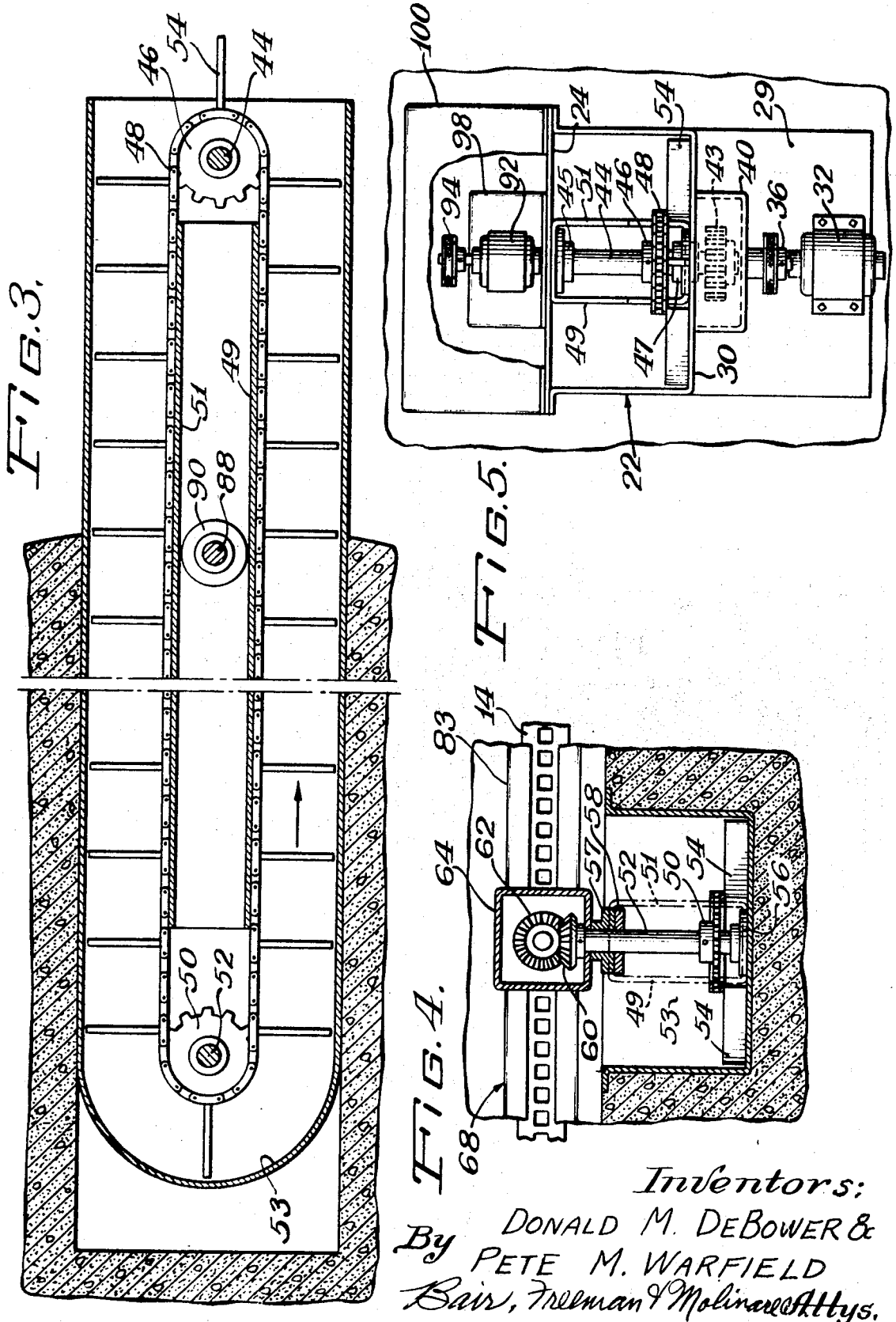

May 26, 1970  D. M. DE BOWER ET AL  3,513,994
BOTTOM DISCHARGE SILO CONSTRUCTION
Filed Sept. 27, 1968  3 Sheets-Sheet 3

Inventors:
DONALD M. DeBOWER &
PETE M. WARFIELD
By Bair, Freeman & Molinare
Attys.

United States Patent Office 3,513,994
Patented May 26, 1970

3,513,994
BOTTOM DISCHARGE SILO CONSTRUCTION
Donald M. De Bower and Pete M. Warfield, Cedar Falls, Iowa, assignors to Clay Equipment Corporation, Cedar Falls, Iowa, a corporation of Iowa
Filed Sept. 27, 1968, Ser. No. 763,125
Int. Cl. B65g 65/46
U.S. Cl. 214—17                  5 Claims

ABSTRACT OF THE DISCLOSURE

A mechanism is provided for discharging silage and the like from the bottom of a cylindrical silo. A radially disposed auger attached at its outer end to a rotatable ring and pivoted at its inner end is caused to move in a plane parallel to the floor of the silo while being rotated about its longitudinal axis to move cut silage inwardly of the silo to a center opening in the floor of the silo. A drive for the rotatable ring is located exteriorly of the silo. Flight-type conveyor means conveys the cut material generally radially outwardly of the silo.

BACKGROUND OF THE INVENTION

This invention relates to a mechanism for effecting removal of silage from the bottom of a mass of silage within a silo.

The storage of silage, grain or other materials in a silo is well known. Preferably new materials (silage, grain and the like) are placed in the silo from the top and drawn out at the bottom for use as required. Modern farming techniques often require that the silo be substantially air tight in order to inhibit deterioration of the materials stored and in order to keep the materials dry. Such silos are also filled at the top and the silage or the like is then to be drawn from the silo at the bottom through access openings that substantially restrict entrance of air.

Many mechanisms have been suggested for withdrawing materials from the bottom of a silo. For example, it has been suggested to use augers which fit through openings in the side of the silo at the bottom and which are adapted to swing about the interior of the silo to cut silage from the mass within the silo or removal thereafter. Another suggestion has been to locate an auger on the interior of the silo which moves about a fixed pivot point at the center of the silo and which cuts the silage and then rotates about its own axis to direct the cut silage into a central opening at the bottom of the silo where a second conveyor then directs the material from below the central opening in the silo floor to a point outwardly of the silo walls. This type of silo is advantageous for construction of substantially air tight silos because only a single exit in the bottom of the silo floor is required. Typical of the latter suggestion are the devices shown in U.S. Pats. 1,275,558; 2,969,156; and 3,121,501.

One probem with such prior construction lies in the drive means needed to effect rotation of the auger both about the axis of the silo and about the axis of the auger. In certain of the prior arts, the tractor means for rotating the auger about the two axes are exposed and are susceptible of being easily fouled by cut silage, or multiple motors are required for rotating the auger about the two axes, or complex and expensive drive mechanisms including tracks and moving carriages are used for effecting rotaton of the auger about the two axes.

The principal purpose of this invention is to provide an improved construction which avoids the problems of prior constructions.

SUMMARY OF THE INVENTION

In a principal aspect the present invention comprises the improvement in a device for effecting discharge of silage from the bottom of a silo of circular ring means in annular recess means on the inside of the silo driven through a single aperture in the silo wall. Conveying means are fixed to the ring means and are driven about the center axis of the silo to thereby discharge silage into a centrally disposed silage discharge opening in the silo floor. The discharged materials are then carried to a point external the silo.

It is thus an object of the present invention to provide an improved silo discharge means.

It is a further object of the present invention to provide means for discharging silage or other materials from the bottom of a silo. Such means can be used with sealed and unsealed storage silos or towers.

It is a further object of the present invention to provide a silo discharge means which is economical to manufacture, easy to install and which will provide trouble-free service.

Still another object of the present invention is to provide an auger discharge means swingable about a fixed central point at the bottom of a silo and adapted to discharge silage and other materials into a central bottom opening of the silo. Preferably included is a second conveying means for conveying materials to a point external the silo as they are discharged through the central opening to a position under the silo floor.

These and other objects, advantages and features of the present invention will be more completely set forth in the detailed description which follows.

BRIEF DESCRIPTION OF THE DRAWINGS

In the detailed description which follows, reference will be made to the following figures:

FIG. 1 is a top plan view of the silo discharge construction of the invention;

FIG. 2 is a side cross sectional view taken substantially along the line 2—2 of FIG. 1 and illustrates the drive mechanism for the auger inside of the silo as well as the drive mechanism for propelling the auger in a path along the floor of the silo;

FIG. 3 is a plan cross sectional view taken substantially along the line 3—3 of FIG. 2 and shows the paddle wheel conveying system for moving materials from the opening at the center floor of the silo;

FIG. 4 is a side cross sectional view taken substantially along the line 4—4 in FIG. 2 and illustrates the drive train interconnection between the paddle wheel conveyor illustrated in FIG. 3 and the auger on the interior of the silo;

FIG. 5 is an end view of the motors and drive train for the silo discharge mechanism shown in FIG. 2;

DESCRIPTION OF THE PREFERRED EMBODIMENT

Figure 6:
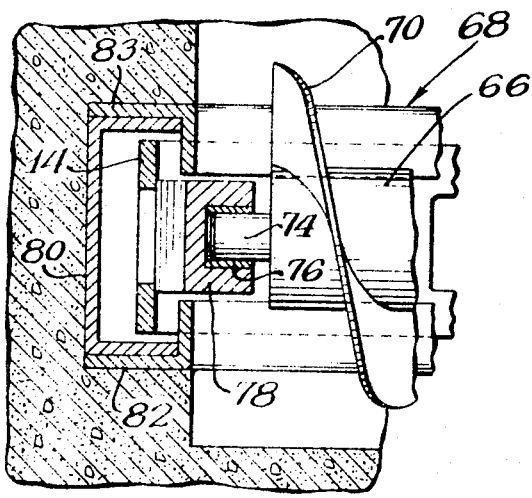
FIG. 6 is a side cross sectional detail of the interconnection of the silo auger and the ring member around the interior base of the silo.

Referring now to FIG. 1, there is shown a top plan view of the bottom discharge silo construction of the present invention. The invention is particularly adapted for use with a cylindrical shaped silo such as is partially shown at 10 in FIG. 1. This is not to say that the invention may not be used with other shapes of silos or storage bins since it may be installed at the bottom of almost any shape of storage bin. However, the path that an auger, as at 12, may sweep on the floor of a silo is limited, more or less, to a circle having the auger, as at 12, defining the radius of the circle. Of course, modifications are possible wherein the path is other than circular. The auger, as at 12, still must pass about an axis for discharge of silage or other stored materials into an opening coincident with the axis at the bottom of a storage bin.

The discharge construction is comprised of two conveying means. The first conveying means comprises the auger 12 situated on the interior of the silo 10 and adapted to sweep out a plane at the bottom of the silo. Generally this plane is parallel to the floor of the silo. In particular the plane is determined by the locus of travel of auger 12. The auger 12 moves silage or other materials for discharge into a central or bottom discharge opening 16 in the floor of the silo 10.

The second conveying means, generally shown at 18 in FIGS. 1 and 2, is comprised of a tunnel and paddle wheel conveyor combination and is adapted to remove the silage from the center of the silo to a point external the silo. While an auger 12 is shown as the first conveying means and a paddle wheel conveyor 20 is shown as part of the second conveying means, equivalent conveying means may be substituted therefor to provide for movement respectively into the discharge opening 16 and from the discharge opening to a point external the silo.

Referring again to FIGS. 1 and 2, the second conveying means 18 includes a tunnel 22, preferably with concrete or steel plate walls. A top wall 24 is positioned flush with the floor or bottom 26 of silo 10. Although not depicted, the floor 26 of the silo may be funnel shaped and inclined toward the center of the silo or, in other words, toward the discharge opening 16 to further facilitate movement of silage into the opening 16. The top tunnel wall 24 would also be correspondingly inclined to remain flush with the floor 26 of the silo 10.

Attached by means of braces 28 and 29 at the exterior of the silo to a bottom tunnel wall 30 is an electric motor 32 adapted to drive the paddle wheel conveyor 20 and auger 12. FIGS. 2 and 5 depict the electric motor 32 connected by means of a drive belt 34 to a pulley 36 and shaft 38 mounted in a gear box 40. Reduction gears 42 and 43 are utilized to provide torque to a drive shaft 44 securely mounted in bearings 45 and 47 attached to the top tunnel wall 24 and bottom tunnel wall 30 respectively.

A spur gear 46 is attached to drive shaft 44 and drivingly engages an endless drive chain 48. Drive chain 48 passes around an idler gear 50 mounted on a central auger drive shaft or post 52. The central auger drive shaft 52 is positioned substantially on the center axis of the silo 10 and is journaled in a bearing 56 in bottom wall 30 and bearing 57 in brace 58 attached to top wall 24. This is illustrated in FIGS. 2 and 3. A plurality of spaced paddle boards or flights as at 54 are attached at equal intervals to the chain 48. Thus, as the drive gear 46 is driven in a counterclockwise direction as denoted by the arrow in FIG. 3, the drive chain 48 and paddle boards 54 sweep along the bottom wall or surface 30 of the tunnel 22 removing silage from the central discharge opening 16 and discharging the silage from the external end of the tunnel 22.

Vertical inner tunnel walls 49 and 51 run along the interior of tunnel 18. Walls 49 and 51 serve to protect a drive shaft 88 from being fouled with silage and also serve as bearing surfaces for the straight parallel runs of chain 48. An arcuately curved vertical end tunnel wall 53 is provided beneath the opening 16. Wall 53 coincide substantially with the radius of travel of paddle boards 54 to insure that the paddle boards 54 sweep all silage from the tunnel 22 .

As the central shaft 52 rotates in a counterclockwise direction, a drive bevel gear 60 on the end of the shaft 52 engages a bevel gear 62 at the central end 61 of the auger 12. A bearing box 64 protects the bevel gears 60 and 62 from fouling with silage or the like and also insures that the bevel gears 60 and 62 remain meshed. The shaft 66 at the central end 61 of the auger 12 is freely rotatable in the opening through the bearing box 64. Likewise, shaft 52 is freely rotatable through its opening in bearing box 64. In this manner the shaft 52 provides power to drive the auger in the rotational sense indicated by the arrow in FIG. 2. In addition, the auger 12 is simultaneously swept through an arc or planets about the shaft 52 along the floor 26 of the silo 10 by means described below.

The outer end of the auger 12 is connected with a ring or band member 14 which in turn is mounted in a bracket assembly or annular recess 68 extending about the circumference of the inner wall of the silo 10. FIG. 6 more clearly illustrates the interconnection construction between the auger 12 and ring member 14. The auger 12 includes a blade 70 on central shaft 66. At the end of the shaft 66 is a rod 74. Rod 74 is journaled in a bearing 76 which is mounted in a cylindrical opening of a rod holder 78. The rod holder 78 is welded or otherwise rigidly connected to the ring member 14. Thus, the auger 12 may freely rotate about its shaft 66 as it is displaced by ring member 14.

Figure 7:
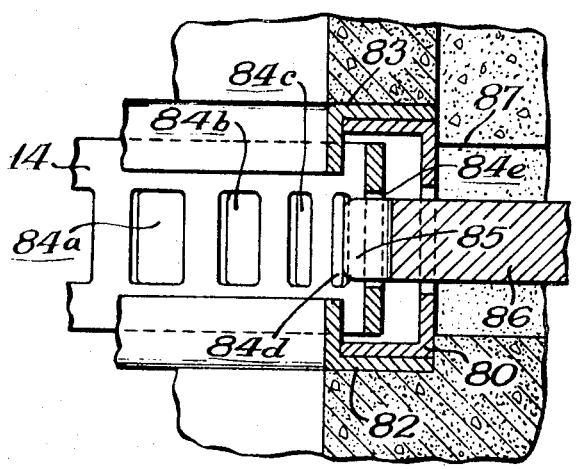
FIG. 7 is a side cross sectional detail of the spur gear drive for the ring member.

FIG. 7 shows further detail of the construction of the ring member 14. The ring member 14 is a continuous circular metal band which fits between an inside bracket 80 mounted in the wall of silo 10 and outside brackets 82 and 83 mounted flush with the wall of the silo 10. The brackets 80, 82 and 83 comprise bracket assembly 68. The ring member 14 includes a plurality of equally sized and equally spaced openings or apertures as at 84a through 84e in FIG. 7 defined along the entire length of the ring member 14. As will be noted by reference to FIG. 6, the shaft holder 78 is fastened to the ring member 14 so as to avoid interference with the opening 84. Thus, a tooth of a spur gear fits through the opening 84 in FIG. 6 adjacent the rod holder 78 in the same manner that tooth 85 of a spur gear 86 fits through opening 84e in FIG. 7.

As may be seen by reference to FIGS. 1, 2, 7 and 9, spur gear 86 passes through an access aperture 87 in the wall of the silo and mates or meshes wih openings as at 84e to draw the band 14 through the bracket assembly 68 defined by the brackets 80, 82 and 83. As shown in FIGS. 1 and 2, the spur gear 86 is mounted on a fixed ring drive shaft 88. The ring drive shaft 88 is rotatably mounted in a bearing plate 90 on bottom tunnel wall 24 and in a bearing case 91 in the wall of silo 10.

An electric motor 92 drives gears 95 and 97 in reduction gear box 96 means of a belt 94. Motor 92 and gear box 96 are mounted in a housing 98 protected by a cover 100. Gear box 96, in turn, provides a power takeoff spur gear 101 for drive chain 192 which passes around drive gear 104 mounted on the ring drive shaft 88. In this manner the ring drive gear 86 drives the ring member 14 in the manner and direction illustrated by the arrows in the figures.

Figure 8:
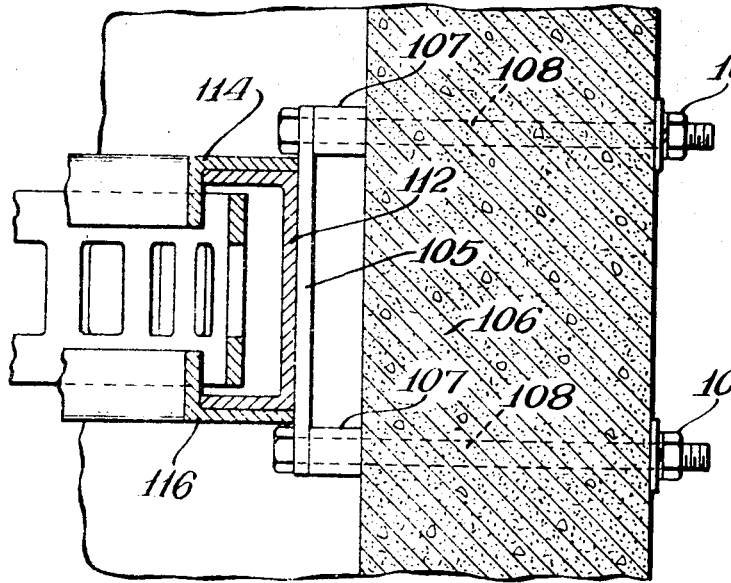
FIG. 8 is a side cross sectional view of an alternative means for mounting the ring member on the interior of the silo.
Figure 9:
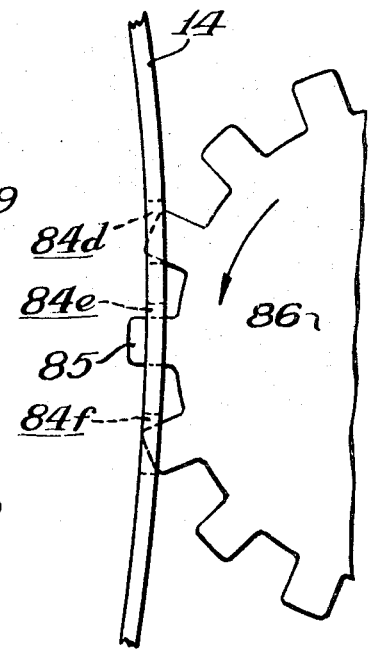
FIG. 9 is a plan view of the spur gear ring member drive.

There is shown illustrated in the FIG. 8 an alternative arrangement for mounting a ring band 14 on a silo wall. In FIG. 8 a mounting plate 105 is held spaced a fixed distance from the wall 106 of a silo by means of spacers 107 cooperating with nuts and bolts 108 and 109. An inside bracket 112 is securely attached to the plate 105 by welding, for example. An upper outside bracket 114 and a lower outside bracket 116 in combination with the inside bracket 112 define a channel through which the band 14 may slidably move. The alternative construction of FIG. 8 is especially useful when it is desirable to convert an old silo to the use of the construction of the present invention. The bracket and channel construction illustrated in the remaining figures and previously described in more appropriate for the construction of a new silo since the bracket can be more easily included within the side walls of the silo during the initial building of the silo, In operation, motors 32 and 92 are turned on. Preferably, motor 32 is initially started so that auger 12 and paddle wheel conveyor 20 may develop some inertia to overcome the packed silage before the auger 12 begins sweeping. The motor 92 then provides drive to ring member 14 causing the auger 12 to sweep a path along floor 26 and discharge silage to opening 16. As the auger 12 sweeps out a path, the silage above and behind the auger path feeds downward due to gravity. Thus, the auger 12 may continuously circle the silo floor to discharge silage.

There are numerous advantages of the construction of the present invention. For example, by maintaining the ring member 14 in a channel formed of brackets as shown in FIG. 7 or 8, the ring member will rarely become clogged with silage or other material and will not be fouled and rendered useless. Moreover, should the ring member tend to become clogged, the spur gear as at 86 is arranged so that its teeth 85 will tend to force the clogging material out of openings as at 84a–84e into the interior of the silo. The device is thus, more or less, self-cleaning. Moreover, all of the power and gear trains except shaft 52 are external to the silo thereby utilizing less space inside the silo and providing more storage space. Moreover, should the motors of gear trains need to be repaired, the ease of access on the outside of the silo also proves to be an advantage. Finally, since only the central floor opening is required, air tight construction of a silo is greatly facilitated.

What is claimed is:

1. In a bottom unloading mechanism for a silo wherein a radially extending cutter means cuts silage in the region immediately above the silo's floor and moves such cut silage radially inwardly to a central opening in the floor, the improved construction comprising, in combination: a substantially cylindrical-walled, upright silo; annular bracket means spaced above the bottom of the silo and adjacent the inner periphery of the silo and defining a circular channel bounded by a radially outer wall having an access aperture therein, and a radially inner wall having an aperture therethrough along the entire circular periphery thereof, circular ring means rotatably positioned in said circular channel, said ring having equally sized tooth means equally spaced thereon and aligned with said access aperture in the radial outer wall, a holder secured to said ring and extending radially inwardly of the inner wall of the bracket means through the said aperture in the radially inner wall; connector means on the holder interconnecting with the radially extending cutter means to cause cutter means to rotate with the ring about the upright axis of the silo; and a drive means extending through the access aperture in the radial outer wall of the bracket means and engaging the tooth means on the ring to cause the ring to rotate in said circular channel.

2. A device as in claim 1 wherein the radially inner wall of the bracket means lies substantially coincident with the inner surface of the silo.

3. A device as in claim 1 wherein the annular bracket means is of sheet metal, the silo wall is of cast aggregate, and the bracket means is embedded in the silo wall.

4. A device as in claim 1 wherein the cutter means is in the form of an auger that is rotatable about an axis extending generally radially of the center of the silo and whose radially outer end terminates in an axial rod-like stud; and the connector means of the holder including a bearing for rotatably receiving therein said rod-like stud of the cutter means.

5. A device as in claim 1 wherein the tooth means on the circular ring is a series of uniformly spaced apertures, and the drive means includes a driven spur gear positioned to have a portion thereof extend through the access aperture in the outer wall of the bracket means to have the teeth thereof drivingly engage with the apertures in the circular ring.

References Cited

UNITED STATES PATENTS

| | | |
|---|---|---|
| 3,259,538 | 7/1966 | Schnyder. |
| 3,368,703 | 2/1968 | Lusk. |
| 3,394,825 | 7/1968 | Reed. |

ROBERT G. SHERIDAN, Primary Examiner